March 13, 1956 W. L. ROLLER 2,738,069
METHOD AND APPARATUS FOR GRAVITY SEPARATION
OF COAL AND OTHER MINERALS
Filed July 30, 1952
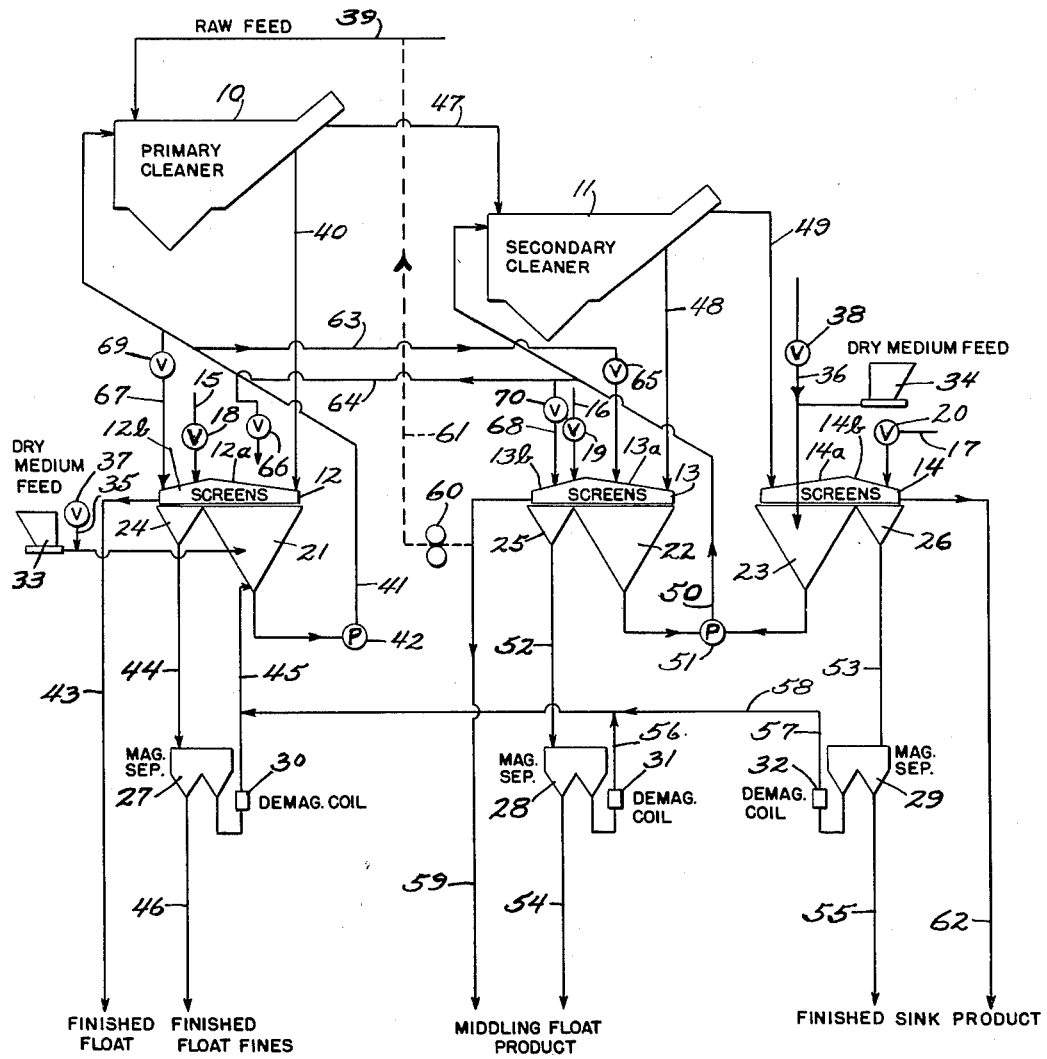
INVENTOR.
WILFERD L. ROLLER
BY John D. Meyers
ATTORNEY

United States Patent Office 2,738,069
Patented Mar. 13, 1956

2,738,069

METHOD AND APPARATUS FOR GRAVITY SEPARATION OF COAL AND OTHER MINERALS

Wilferd L. Roller, Hazleton, Pa., assignor to Wilmot Engineering Company, a corporation of Pennsylvania Application July 30, 1952, Serial No. 301,679

5 Claims. (Cl. 209—172.5)

This invention relates generally to the gravity separation of components of different specific gravity from mixtures of such components, such as, for example, the separation of high grade coal from a mixture therewith of rock and boney material characteristic of run-of-mine anthracite, or the concentration of ores by the separation of desired components from the undesirable gangue normally cocurring in the ore. The invention is particularly concerned with the separation, cleaning or concentrating of coal or other minerals by subjecting them to the action of heavy density separation media the specific gravities of which are determined and regulated by the proportion of finely divided solid particles, such as magnetite, held in suspension in a liquid vehicle, which is usually water.

The purification and concentration of minerals by subjecting them to gravity separation in a liquid medium of specific gravity intermediate the specific gravities of the desired and undesired components of the minerals has long been known, but heretofore the methods and apparatus used for such separations have been unduly complicated and costly because of the extensive array of recovery apparatus required to permit the separation medium to be reused indefinitely, with the result that the initial cost of building a plant to practice such methods has been prohibitive. For example, in heavy density separation plants constructed in accordance with the prior art it was customary to include in the circuit of the liquid separating medium an unwieldy assortment of sumps, thickeners and densifiers in order to prepare the liquid medium for reuse in the gravity separation step.

But the necessity for such additional equipment is not the only shortcoming of prior art gravity separation methods. As is well known in the art of preparation of coal or beneficiation of ores, it is essential to proper separation to maintain the specific gravity of the separation medium as constant as possible. It is also well understood by the art that the throughput of coal or ore in any separation operation is by no means constant. The latter factor tends constantly to change the specific gravity of the separating medium in the separation vessel by removing more or less of the solid component of the medium through its adherence to the coal or ore particles leaving the vessel. Because the prior art methods and apparatus for carrying out heavy density separation are burdened as aforesaid with a complicated array of equipment, and thus require considerable time for treating the separation medium for reuse after each separation step, it will readily be understood that the specific gravity of the liquid medium in a separation vessel employed in such prior art systems necessarily varies widely with continuing changes in volume of coal or ore being cleaned, and that correction of the specific gravity value of the medium in the separation vessel by return thereto of properly treated medium from an earlier separation step is so delayed that a considerable volume of raw feed may be treated at the wrong specific gravity before restoration of the separation medium to its proper specific gravity can be achieved.

In accordance with the present invention the liquid separating medium recovered from a sink-float separation step is quickly returned to the separation vessel from which it came, so that the variations in specific gravity of the liquid medium in the vessel are minimized, with the result that the separation of coal or ore is carried out more efficiently than in the prior art method just described.

It is an object of the invention to provide a novel heavy density separation method in which the specific gravity of the liquid separating medium is maintained substantially constant even though the volume of raw feed being treated may be varied widely.

Another object is to provide a multiple-phase system for heavy density separation wherein the separating medium is composed of solid magnetic particles suspended in water, and including conduits for transfer of medium between the several phases whereby the specific gravities of the media in the several phases are maintained at their desired values with a minimum of adjustment.

A further object is to provide a system for the gravity separation of coal or other minerals, capable of more efficient operation and more rapid control of the specific gravity of the separating media, and with fewer pieces of apparatus, than could be achieved by separation systems of the prior art.

The above and other objects and advantages of the invention will become apparent from the description which follows, reference being had to the accompanying drawing in which a heavy density separation system according to the invention is schematically illustrated.

In the drawing, the numeral 10 denotes a primary cleaning vessel of a multiple-unit, or multiple-phase, separation system wherein the initial separation of the raw feed is effected, and 11 indicates a secondary cleaning vessel in which a further separation may be carried out. The specific construction of the cleaning vessels 10 and 11 is immaterial to the present invention, although I prefer to use vessels of the type described and claimed in my copending application, Serial No. 301,680, filed July 30, 1952, now Patent No. 2,720,971, in which the float product flows with a stream of the liquid medium through a weir at one side of the vessel, and the sink product is removed from the bottom of the vessel by a conveyor and carried upwardly along an inclined conveyor compartment and discharged from the end thereof. In such apparatus a drain grid is provided adjacent the discharge end of the conveyor compartment through which excess liquid medium carried upwardly with the sink product by the conveyor is drained off for recirculation to the cleaning vessel. For the sake of convenience the raw feed being cleaned will be referred to in the following description as run-of-mine coal, and the heavy density separation medium will be considered to be water having in suspension a substantial proportion of magnetite to increase its specific gravity as desired. It will be understood, of course, that the present method and apparatus may be employed as well for cleaning feed materials other than coal, and that the separating medium may comprise a suspension in water of some other solid than magnetite, e. g., ferro silicon, if desired.

A screen 12 is provided to receive the float product from the cleaner 10, and screens 13 and 14 receive respectively the float and sink products from the secondary cleaner 11. The screens 12, 13 and 14 are provided with drain areas 12a, 13a and 14a, respectively, in which the excess liquid medium drains from the coal being screened, and wash areas 12b, 13b and 14b, respectively, where the coal is washed with the liquid vehicle (water) of the medium to remove the magnetite adhering to the coal as it leaves the cleaning vessels 10 and 11. Wash water is introduced into the washing areas 12b, 13b and 14b of the screens by water lines 15, 16 and 17, respectively, the flow therein being controlled by corresponding valves 18, 19 and 20.

Sumps 21, 22 and 23, hereinafter referred to as "medium sumps," are positioned respectively under the drain areas of the several screens to collect the liquid medium entering the screen with the coal, and additional smaller sumps 24, 25 and 26 (hereinafter referred to as "wash sumps") are provided below the wash areas to collect the wash water.

The wash waters collected in the several wash sumps are rectified or concentrated in their magnetite component by being passed through magnetic separators 27, 28 and 29, before the wash waters are recycled for further use. In addition to removing a substantial amount of water, the magnetic separators remove the non-magnetic fines which cling to the coal along with the magnetite and hence collect in the wash water. The magnetic separators per se are not part of the present invention and, therefore, will not be described in detail, it being thought sufficient here to state, by way of explaining their function, that the wash water flowing therethrough is caused to pass a permanent magnet which separates the magnetic particles from the non-magnetic particles, the water being shared therebetween. The water containing the magnetic particles (magnetite) is conducted from the magnetic separators 27, 28 and 29, through demagnetizing coils 30, 31 and 32, respectively, and the demagnetized product returned to the separating system, thus replacing the magnetite removed from the cleaners 10 and 11 by adherence to the feed particles. Since a certain small proportion of magnetite is inevitably lost in the cleaning process, make-up quantities thereof may be added to the system by means of a hopper 33 which discharges magnetite into the sump 21, as shown, for circulation to the primary cleaner 10. For convenience, an additional hopper 34 for introducing additional magnetite into the sump 23 of one of the secondary screens may be provided, although this means for adding magnetite is not necessary, as will appear hereinafter. Make-up water for controlling the specific gravity of the medium is conveniently added to the sumps 21 and 23 by means of lines 35 and 36, respectively, provided with valves 37 and 38, respectively.

In operating the above described apparatus in accordance with the gravity separation method of the invention, raw feed such as run-of-mine anthracite, represented by the line 39, is introduced into the primary cleaner 10 where the initial sink-float separation is carried out in a liquid separating medium preferably of relatively low specific gravity, for example 1.5. A separation at such a low specific gravity will yield a high grade coal as the float product and a sink product composed of rock and middlings. The float, represented by line 40, flows onto the drain area 12a of the screen 12 through which the liquid medium accompanying the float drains into the sump 21, whence the liquid medium may be returned to the primary cleaner 10 through a line 41 provided with a pump 42. As the float material proceeds along the screen 12, it passes over the wash area 12b where it is washed with water introduced through the line 15 to remove adhering magnetite and float fines, and the finished float is discharged from the screen as represented by the line 43. The wash water is collected in the sump 24 whence it flows through a line 44 to the magnetic separator 27 which removes the float fines and part of the water, thereby concentrating or rectifying the wash water to make it suitable for mixture with the separating medium. The rectified wash water is then conveyed through the demagnetizing coil 30, to demagnetize the recovered magnetite, and is then conveyed through a line 45 to any convenient point in the primary circuit of the liquid medium, for example the sump 21, for mixture with the medium therein. The non-magnetic effluent from the magnetic separator 27 is collected as finished float fines, as represented by the line 46.

The sink product from the primary cleaner 10, represented by the line 47, is conveyed directly and without intervening treatment to the secondary cleaner 11 in which the separating medium is maintained at a higher specific gravity (e. g., 1.9) than that of the medium in the primary cleaner. The float from the secondary cleaner, represented by line 48, flows onto the screen 13, while the sink product of the secondary cleaner, represented by line 49, is conveyed to the screen 14. Treatment of the products on screens 13 and 14 is the same as that previously described for the primary float product on screen 12. The drained media from sumps 22 and 23 are returned to the secondary cleaner through a common line 50 under pressure of a pump 51, and the wash waters from sumps 25 and 26 pass respectively through lines 52 and 53 to the magnetic separators 28, 29. The non-magnetic effluents from magnetic separators 28, 29 are collected as middling float and finished sink products as represented by lines 54 and 55 respectively. The magnetic effluents (concentrated or rectified wash waters) from the magnetic separators 28, 29 are demagnetized by coils 31, 32, respectively, and flow through lines 56, 57 to a common line 58 which conveys these rectified wash waters to the line 45 where they join the rectified wash water from the screen 12.

The float product from screen 13 may go to a middling float storage area, as represented by the line 59, or it may be crushed by rolls 60 and returned, as represented by the dotted line 61, to the raw feed line 39 for retreatment. Sink product from screen 14 is conveyed directly to finished sink storage as represented by line 62.

As stated hereinabove, one of the objects of the invention is to provide a heavy density separation system wherein the specific gravity of the medium is maintained substantially constant in the separating vessels (cleaners), and this is accomplished in large measure by conveying the rectified wash waters by means of the line 58 from the screens 13 and 14 to join that from the screen 12. It will be apparent that, even though a smaller proportion of magnetite is maintained in suspension in the low specific gravity medium of the primary cleaner 10 than in the higher specific gravity medium of secondary cleaner 11, substantially the same quantity of magnetite will leave cleaner 10 by adherence to the primary sink product as will leave secondary cleaner 11 by adherence to both float and sink products of the secondary cleaner, since the flow of coal or ore components into the secondary cleaner (all of which comes from the primary cleaner) is equal to that leaving it. In other words, substantially all the magnetite entering the secondary cleaner, by adherence to the sink product of the primary cleaner, will leave the secondary cleaner by adherence to the float and sink products of the secondary cleaner. Therefore, when the recovered magnetite of the wash waters from screens 13 and 14 is joined with that from screen 12, this amounts simply to returning to the primary cleaner the magnetite which was carried therefrom by the sink and float products previously removed from the primary cleaner. The input and output of magnetite to both the cleaners 10 and 11 is therefore maintained substantially constant.

To provide greater flexibility of operation of the apparatus described above I have provided by-passes by which the liquid medium from the circuit of the primary cleaner 10 may be transferred to the circuit of the secondary cleaner 11, and vice versa, whereby the specific gravity of the medium in either vessel may be quickly changed by transferring to it medium of a different specific gravity from the circuit of the other cleaner. These by-passes are shown as pipe lines 63 and 64, the former connecting the medium return line 41 to the sump 22, and the line 64 connecting the medium return line 50 with the sump 21. Valves 65 and 66 respectively control the volume of medium transferred through the lines 63 and 64. Recirculation lines 67 and 68, controlled by valves 69 and 70, respectively, are adapted to draw off any desirable volume of medium from return lines 41 and 50, respectively, so that non-magnetic fines and excess water may be removed from the medium by the magnetic separators 27 and 28.

It will be understood that the arrangement and/or operation of the cleaning apparatus disclosed herein may be varied without departing from the spirit of the invention, and it is therefore intended that such variations and modifications be embraced by the present invention so long as they come within the scope of the appended claims.

What I desire to claim is:

1. In a heavy density separation method, the steps including subjecting a raw feed of solid materials of different specific gravity to a sink-float separation in a first body of separating medium, said medium comprising a suspension of finely divided magnetic particles in water, subjecting one of the products of said first separation to a further sink-float separation in a second body of said medium of different specific gravity from that of said first body of said medium, draining excess separating medium from the products of said further separation, returning said drained medium to said second body of medium, magnetically recovering said magnetic particles adhering to the drained products of said further separation and conveying said recovered magnetic particles to said first body of medium.

2. In a heavy density separation method, the steps including subjecting a raw feed of solid materials of different specific gravity to a sink-float separation in a first body of separating medium, said medium comprising a suspension of finely divided magnetite in water, separating the sink product from said first body of separating medium and without intervening treatment of said sink product subjecting the latter to a further sink-float separation in a second body of said medium of different specific gravity from that of said first body of said medium, draining excess separating medium from the products of said further separation, returning said drained medium to said second body of medium, recovering any magnetite particles adhering to said drained products of said further separation, and conveying said recovered magnetite particles to said first body of medium.

3. In a heavy density separation method, the steps including subjecting a raw feed of solid materials of different specific gravity to sink-float separation in a liquid medium in a first vessel, said medium comprising a suspension of finely divided magnetic particles in a liquid base, removing the float product from said vessel and without intervening treatment draining excess medium from said float product and returning said excess medium to said vessel, washing said drained float product with said liquid base to remove adhering magnetic particles and non-magnetic fines therefrom, magnetically rectifying the wash liquid thus formed to reduce the proportion of said liquid base and to remove said non-magnetic fines therefrom, conveying said rectified wash liquid to said vessel, draining excess separating medium from the sink product and without intervening treatment thereof conveying said sink product to a second vessel, returning to said first vessel the medium drained from said sink product, subjecting said sink product to a second sink-float separation in said second vessel in a second liquid medium similar to said first mentioned medium but of different specific gravity, removing said second separation products separately from said second vessel, draining excess second medium from said second separation products, returning said excess second medium to said second vessel, washing said drained second separation products with said liquid base and rectifying the wash liquid so formed, as aforesaid, and conveying said rectified second mentioned wash liquid to said first vessel.

4. In operating a heavy density separation system including several successive gravity separations and wherein the several separation media comprise suspensions of finely divided solid particles in a liquid vehicle, the specific gravities of said media being determined by the proportion of said solid particles in said vehicle; the steps including subjecting a raw feed of solid materials of different specific gravity to a first sink-float separation by a first body of such medium, without intervening treatment draining the excess of said first medium from the float and sink products of said first separation, returning said drained excess medium without further treatment to said first body of medium, washing said drained float product with said vehicle to recover solid particles of said medium clinging thereto, rectifying the wash liquid thus obtained to increase the proportion of said solid particles therein, conveying said rectified wash liquid to said first body of medium, subjecting said drained sink product without intervening treatment to a second sink-float separation by a second body of such medium of higher specific gravity than said first medium, draining excess second medium separately from said second separation products, returning said drained excess second medium to said second body of medium, washing said second separation products with said vehicle to recover solid particles of said second medium clinging thereto, rectifying the second wash liquid thus formed to increase the proportion of said solid particles therein, and conveying said rectified second wash liquid to said first body of medium.

5. Heavy density gravity separation apparatus comprising primary and secondary gravity separation vessels for containing liquid separating media, means for conducting the sink material from said primary vessel to said secondary vessel, a primary screen for said primary vessel to receive the float discharge from the latter, said screen having drain and washing areas, a sump under said drain area for collecting medium accompanying the float product from said primary vessel, a conduit for returning said medium from the sump to the primary vessel, means for washing said float product while in said washing area, means for treating the wash liquid thus formed to remove excess liquid and undesirable fines therefrom, a conduit for returning said treated wash liquid to said primary vessel, separate secondary screens for receiving float and sink discharges respectively from said secondary vessel, each of said secondary screens having a drain and washing area, sumps under the drain areas of said secondary screens for collecting medium accompanying the sink and float products from said secondary vessel, conduits for returning said medium from said secondary sumps to said secondary vessel, means for washing said secondary float and sink products in the washing areas of said secondary screens, means for treating the wash liquids from said secondary screens to remove excess liquid and undesirable fines therefrom, and means for conveying said treated last mentioned wash liquids to said primary vessel.

References Cited in the file of this patent

UNITED STATES PATENTS

| | | |
|---|---|---|
| 2,206,980 | Wade | July 9, 1940 |
| 2,325,149 | Rakowsky et al. | July 27, 1943 |
| 2,378,356 | Erck | June 12, 1945 |
| 2,387,866 | Walker | Oct. 30, 1945 |
| 2,621,790 | Lawrie et al. | Dec. 16, 1952 |